UNITED STATES PATENT OFFICE.

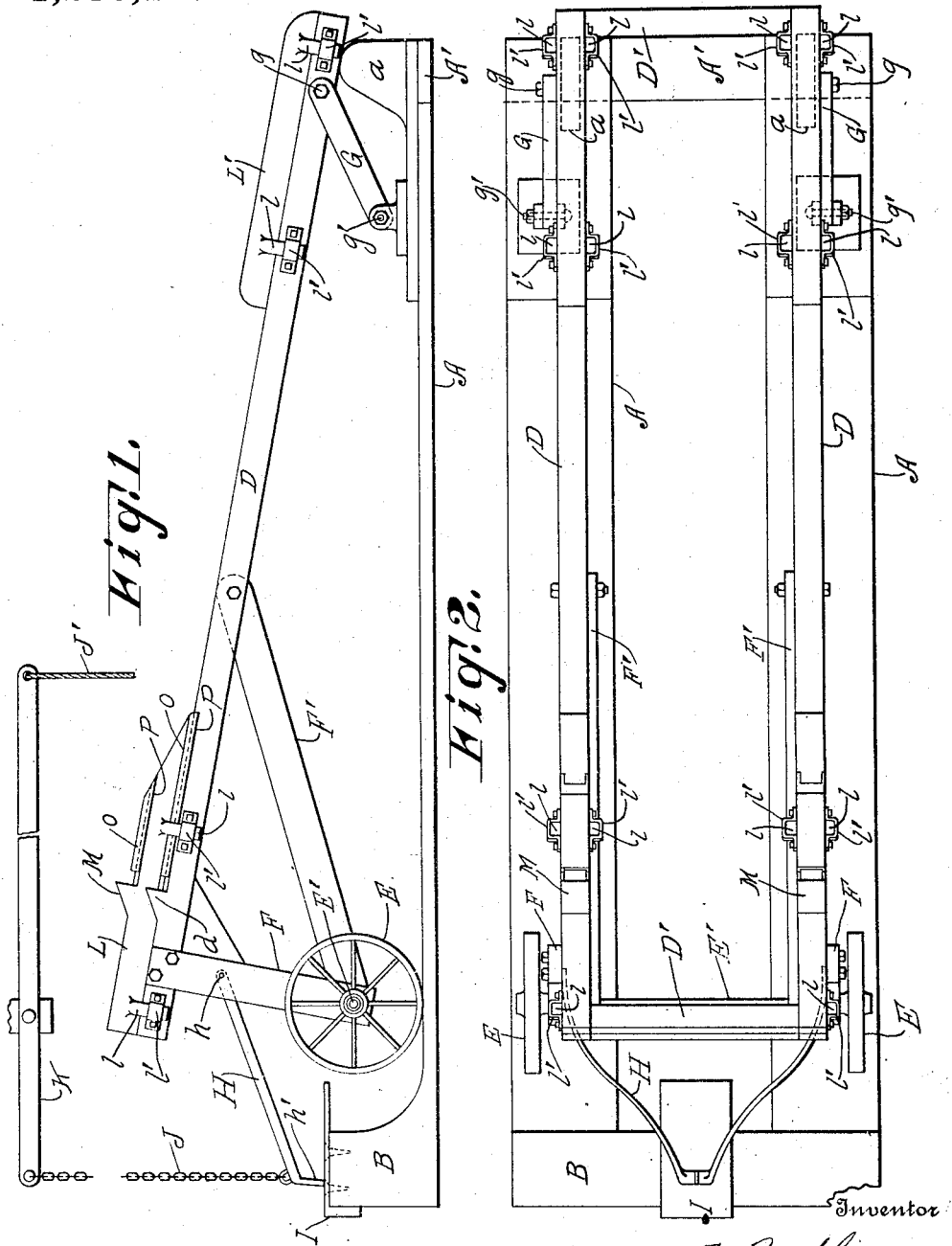

WALTER F. RADKE AND FREDERICK WENTZLAFF, OF BROWN DEER, WISCONSIN.

VEHICLE LIFTING-JACK.

1,288,187.  Specification of Letters Patent.  Patented Dec. 17, 1918.

Application filed April 29, 1915.  Serial No. 24,642.

*To all whom it may concern:*

Be it known that we, WALTER F. RADKE and FREDERICK WENTZLAFF, citizens of the United States, residing at Brown Deer, county of Milwaukee, and State of Wisconsin, have invented new and useful Improvements in Vehicle Lifting-Jacks, of which the following is a specification.

Our invention relates to improvements in lifting jacks for motor driven vehicles.

The object of our invention is to provide a form of jack which can be operated automatically by a slowly moving vehicle and which may be utilized to lift vehicles of different sizes with reference to the length of the wheel base or distance between the axles and the diameter of the wheels or height of the axles.

In the drawings—

Figure 1 is a side elevation of a lifting jack embodying our invention.

Fig. 2 is a plan view of the same.

Like parts are identified by the same reference characters throughout both views.

A base frame including a set of parallel side bars A and a buffer block B is adapted to rest upon the floor with the side bars A parallel to the line of movement of the vehicle, the bars A being in sufficient proximity to permit the vehicle wheels to pass along the sides of the frame without striking it. At the rear end, the base frame is provided with a cross bar A' and raised blocks $a$, the latter being mounted on the side bars A.

A lifting frame comprises a pair of side bars D connected by cross bars D' at its respective ends. Near the front end of the lifting frame, the side bars D are provided with upwardly extending shouldered projections $d$ against which the front axle of a vehicle may impinge. The front ends of the frame are also supported from the floor by wheels E and bolster posts F connected with the axle shaft E' of the wheels. The bolster posts F are connected with the lifting frame by link rods F'. Near the rear end of the lifting frame, a set of links G connect the side bars D of the lifting frame with the base frame side bars A, these links being pivoted to the lifting frame and base frame by pivot bolts $g$, $g'$ respectively. At the front end of the lifting frame a latch member H is pivotally connected therewith, the same being preferably pivoted to the bolster posts F at $h$, whereby the latch member H may swing upwardly or downwardly. At its front end the latch member H has a hook shaped downwardly projecting lip $h'$, which is adapted to engage the front end of a catch plate I secured to the buffer block B. A chain J is secured to the front end of the latch H and extends to a raised lever K with an operating rope J' hanging within reach of a person standing on the floor, whereby when the latch H is in engagement with the front end of the catch I, the person in charge may, by pulling upon the free end of the rope J', lift the latch and release it from the catch.

In operation, assuming the parts to be in the position illustrated in Fig. 1 with the rear end of the lifting frame depressed and also assuming that the shouldered projections $d$ are in position to engage the front axle of a motor driven vehicle, it is then merely necessary to drive the motor driven vehicle over the lifting jack until the front axle engages the projections $d$, whereupon the momentum pressure of the vehicle will be transmitted to the lifting frame causing the wheels E to move forwardly in the direction of the buffer block B until the latch H engages over the front end of the catch plate I. In the meantime the links G will swing toward a vertical position, thereby lifting the rear end of the lifting frame until the rear ends of the bar D engage and lift the rear axle of the vehicle. Owing to the fact that the projections $d$ are located in the rear of the bolster posts F and owing also to the fact that these bolster posts are slightly inclined when the jack is in the lowered position illustrated in Fig. 1, it is obvious that when links G swing toward the vertical position, the posts F will also swing toward the vertical position and the bars D will be sufficiently lifted adjacent to the projections $d$ to raise the front axle of the vehicle until all four of the vehicle wheels are raised above the floor. The latch H having engaged catch I, it is obvious that the vehicle will not be released until a pull upon the chain J' releases latch H from the catch, whereupon the lifting frame may swing rearwardly and downwardly to the position illustrated in Fig. 1, with the rear end portions of the bars F resting upon the projections $a$ of the base frame.

In order that this jack may be utilized for vehicles of different sizes with reference to the height of the axle, we employ a set of auxiliary lifting bar members L and L', which may be applied to the side bars D of the lifting frame and secured thereto by depending arms $l$ which engage suitable brackets $l'$ carried by said bars D. The auxiliary members L are each provided with a stop projection M corresponding with the stop projections $d$ on the side bars D, said projections M receiving the pressure of the front axle of the higher vehicle. Member L is of course raised on its under surface to receive a projection $d$, the latter then serving to relieve the arms $l$ and the brackets $l'$ from strain. The rear auxiliary members L' are also secured to the main lifting frame by arms $l$ engaging in brackets $l'$. No further interlocking engagement is required for these members, since the rear axle does not come in contact with them until they swing up against it and lift it. Owing to the length of the auxiliary members L' and owing to the fact that the side bars L' are adapted to engage the rear axle of a vehicle at any point along their length, it is obvious that this lifting jack can be used for vehicles of differing length regardless of the distance between the axles.

The links G are preferably so formed and connected with the side bars D of the lifting frame that they will not have reached a vertical position when the wheels E strike the buffer block B, and owing to the fact that they are slightly inclined rearwardly at their upper ends when in the raised or lifting position, it is obvious that the jack will automatically return to the releasing position under the weight of the vehicle as soon as the latch H is released from the catch I.

We attach great importance to the fact that the axle engaging members of the lifting frame are adapted to engage the axle of the vehicle at any point along their length. Also to the fact that the projections against which the front axle impinges are rigidly connected with the lifting frame upon which the entire vehicle may be supported when the lifting frame is in the raised position. All parts of the lifting frame being rigidly connected with each other, it is obvious that the entire lifting operation will be simultaneously performed and there is no possibility of any portion thereof twisting out of shape or failing to properly engage the axle of the vehicle. This form of construction enables us to use the auxiliary members L, L', which may be made in sets of different heights corresponding with any and adapted to be interchangeably used in accordance with the requirements of the vehicle to be lifted.

To avoid marring the paint on the under surfaces of the vehicle axles, we preferably employ slides O which may rest loosely on the upper surfaces of the bars D with flanges P engaging the sides of such bars. These slides may be so adjusted with reference to the stops $d$ that they will move forwardly under the pressure of the axle. The bars D will preferably be formed of angle iron upon which the slides O can move with sufficient freedom. It is not necessary that the front axle shall come into actual contact with the stops $d$, since it is obvious that as soon as sufficient pressure is exerted upon the slides O to cause the lifting frame to move in the direction of the buffer B, the lifting frame will be actuated as above described.

We claim—

1. A vehicle lifting jack in which the vehicle is automatically lifted by its own momentum in moving into position upon the jack, including the combination with a fixed base having a substantially horizontal surface, in combination with a lifting frame provided with side bars, a set of supporting wheels for the front end thereof, adapted to hold the front end portions of the side bars with axle engaging surfaces normally at an elevation substantially the same as that of the front axle of the vehicle to be lifted, a set of links pivotally connecting the rear ends of the frame with the base, and adapted to swing upwardly and forwardly, a set of axle engaging stops carried by the frame, in the rear of a plane extending at right angles to the frame, and including the axes of the supporting wheels, and another set of stops supported on the base in position to arrest the forward movement of the wheels when the links have swung from rearwardly inclined positions substantially to vertically disposed positions, whereby when said axle engaging stops are engaged by the axle of a forwardly moving vehicle, the wheels will be pushed forwardly, and the vehicle lifted by the links, as the latter swing from rearwardly inclined positions toward a vertical plane.

2. A vehicle lifting jack, including the combination with a lifting frame provided with an axle engaging projection near its front end, slides on said lifting frame adapted to engage the axle prior to its engagement with the axle engaging projection, and means for utilizing the pushing pressure of such axle to raise the lifting frame to a vehicle supporting position, said lifting frame having side bars of sufficient length to engage both the front and rear axles of vehicles of differing length.

3. A vehicle lifting jack, including the combination with a lifting frame provided with an axle engaging projection near its front end and a link pivotally connected with the base at its rear end, means for utilizing the pushing pressure of such axle to oscillate said link and raise the lifting frame to a vehicle supporting position, said lifting frame having side bars of sufficient length to engage both the front and rear axles of vehicles of differing length, a gravity actuated latch connected with the lifting frame to lock the same in raised position, and means for manually releasing said latch.

4. A vehicle lifting jack including the combination with a base frame, of a lifting frame, links pivoted to the base frame and pivotally connected with the rear end portion of the lifting frame in the rear of the base frame connection, wheels supporting the front end of the lifting frame in a position to receive the front axle of the vehicle, and stops on the lifting frame against which such axle may strike; the side bar of the lifting frame being of sufficient length to engage both axles of the vehicle regardless of variations in the distance between such axles, together with a set of buffer blocks against which said wheels may strike; and a latch to lock the lifting frame in a raised position, with said links extending upwardly and slightly rearwardly whereby, when the latch is released, the lifting frame may swing backwardly and downwardly at its rear end to lower and release the vehicle.

5. A vehicle lifting jack, including the combination with a lifting frame provided with an axle engaging projection near its front end, slides mounted upon the lifting frame and adapted to be engaged and pushed forwardly thereon by the frictional contact of a vehicle axle upon such slides, and means for utilizing the pushing pressure of such axle to raise the lifting frame to a vehicle supporting position, said lifting frame having side bars of sufficient length to engage both the front and rear axles of vehicles of differing length.

In testimony whereof we affix our signatures in the presence of two witnesses.

WALTER F. RADKE.
FREDERICK WENTZLAFF.

Witnesses:
LEVERETT C. WHEELER,
IRMA D. BREMER.

Copies of this patent may be obtained for five cents each, by addressing the "Commissioner of Patents, Washington, D. C."